United States Patent [19]

Capes et al.

[11] 4,303,505

[45] Dec. 1, 1981

[54] SELECTIVE SEPARATION OF HYDROPHILIC COMPONENT FROM MIXTURES USING PASTES

[75] Inventors: Charles E. Capes, Ottawa; Richard D. Coleman, Orleans, both of Canada

[73] Assignee: Arcanum Corporation, Ann Arbor, Mich.

[21] Appl. No.: 86,108

[22] Filed: Oct. 18, 1979

[51] Int. Cl.³ .............................................. B03B 1/04
[52] U.S. Cl. ........................................ 209/5; 209/45; 210/689; 44/1 A
[58] Field of Search ..................... 209/5, 45, 47, 49, 9, 209/171; 210/41, 689, 46; 44/1 A, 6

[56] References Cited

U.S. PATENT DOCUMENTS

| | | | |
|---|---|---|---|
| 1,448,928 | 3/1923 | Luckenbach | 209/49 |
| 1,754,599 | 4/1930 | Bollmann | 210/41 |
| 2,189,698 | 2/1940 | Bierbrauer | 209/49 |
| 2,291,417 | 7/1942 | Bierbrauer | 209/49 |
| 2,717,696 | 9/1955 | Schubert | 210/41 |
| 3,399,765 | 9/1968 | Puddington | 209/5 |
| 3,864,412 | 2/1975 | Murphy | 210/41 X |
| 3,868,318 | 2/1975 | Clark | 209/47 X |
| 4,033,729 | 7/1977 | Capes | 44/1 A |

FOREIGN PATENT DOCUMENTS

| | | | |
|---|---|---|---|
| 507965 | 9/1930 | Fed. Rep. of Germany | 210/41 |
| 226862 | 8/1943 | Switzerland | 209/49 |
| 702703 | 1/1954 | United Kingdom | 210/41 |

Primary Examiner—Robert Halper
Attorney, Agent, or Firm—Blanchard, Flynn, Thiel, Boutell & Tanis

[57] ABSTRACT

A process for selectively removing hydrophilic constituents from flowable hydrophobic mixtures and suspensions which comprises forming a tenacious paste by mixing water with finely divided material which is insoluble or substantially insoluble in water and in the organic liquid in the hydrophobic mixture or suspension, which is inert to the organic liquid and the hydrophobic materials in the hydrophobic mixture or suspension and which is capable of selectively adsorbing said hydrophilic constituents. The paste is formed in a mixing-type liquid-liquid contactor so that a layer of the paste forms on and clings to the impellers and other internal surfaces of the contactor. The hydrophilic mixture or suspension is placed in the contactor and the impellers are rotated at a relatively low speed so that the paste is subjected to gentle agitation by shearing and folding effects caused by rotation of the impellers and contact with the flowable hydrophobic mixture or suspension so that the hydrophilic constituents are adsorbed by the paste and are separated from the remainder of the hydrophobic mixture or suspension.

20 Claims, No Drawings

SELECTIVE SEPARATION OF HYDROPHILIC COMPONENT FROM MIXTURES USING PASTES

This invention relates to a process for separating hydrophilic constituents from hydrophobic mixtures and suspensions containing a hydrophobic organic liquid or oil, by contacting the mixture or suspension with a layer or layers of an aqueous paste of a finely divided solid hydrophilic material capable of selectively adsorbing the hydrophilic constituents of the mixture or suspension. According to the invention, the hydrophilic constituents of the hydrophobic mixture or suspension are transferred into and are collected by the hydrophilic paste and any hydrophobic solids present in the mixture or suspension are washed out with the hydrophobic liquid.

Frequently it is necessary or desirable to remove hydrophilic constituents or constituents which can be rendered hydrophilic, from hydrophobic mixtures and suspensions. Examples of this are removing ash-forming materials from coal-in-oil suspensions, removing sand and clay from an organic liquid suspension, such as tar sands in an organic solvent, and breaking of oil and water emulsions by removing the finely dispersed water. A variety of techniques are available for accomplishing such separations, but the prior art techniques are not always completely satisfactory for a variety of reasons, such as excessive complexity, high cost and the like. It is desired to provide a separation process capable of separating hydrophilic constitutents from organic liquids, which process is easy to perform, employs inexpensive readily available equipment and uses inexpensive materials for collecting the hydrophilic constituent.

According to the invention, there is provided a process for removing hydrophilic constituents from hydrophobic mixtures containing said hydrophilic constituents mixed with a hydrophobic organic liquid, wherein said hydrophilic constituents are present in finely divided form, either as liquid droplets or as fine solid particles. The hydrophobic mixture is contacted with a layer or a plurality of layers of a paste prepared by mixing water with fine particles of hydrophilic adsorbent which is insoluble or substantially insoluble in water, insoluble in and inert to said hydrophobic organic liquid and any hydrophobic materials contained therein, and which adsorbent preferentially adsorbs said hydrophilic constituents. The layer or layers of paste are maintained in coherent form during the process. Preferably, the layers of paste are provided on and tenaciously cling to the rotatable impellers of a mixer, which impellers have a large surface area and are rotated at a relatively low speed. By rotating said impellers, the hydrophobic mixture is caused to move relative to the surface or surfaces of said layer or layers of paste, whereby to gently knead and fold said layer or layers of paste to continuously expose different portions of said paste on the surface of the layer and contact same with said mixture so that the hydrophilic constituents of said mixture preferentially become wetted by the water in the paste and are adsorbed by said hydrophilic adsorbent. The paste remains as a substantially coherent plastic mass during the entire contacting time, but the gentle agitation of the paste is effective to expose fresh surfaces thereof for contact with the hydrophobic mixture. After such contacting is completed, the remainder of the hydrophobic mixture, which is now substantially free of hydrophilic constituent, is removed.

For purposes of convenience in description, the following description will be directed to a coal beneficiation process wherein the inorganic ash-forming materials present in mined coal are removed therefrom by the process according to the invention. It is to be understood, however, that in its broader aspects the invention is applicable to a wide variety of hydrophobic mixtures and hydrophobic suspensions containing hydrophilic constituents (liquid or solid), as noted above.

Coal preparation methods have had to accomodate increasingly finer materials in recent years. These fine coal particles are caused by natural degradation, mechanized mining techniques and by the finer grinding necessary to liberate impurities from lower quality coals. Agglomeration procedures are available to allow these fines to be dealt with in a size-enlarged form and one of the most important of these is agglomeration by wetting same with an immiscible liquid whereby the fine particles are caused to cohere through the action of capillary interfacial forces. For example, in the spherical agglomeration process described by Capes et al, paper H2, Proceedings 7th International Coal Preparation Congress, Sydney, Australia (May, 1976), hydrocarbon liquids are used to wet fine coal particles in aqueous suspension to form larger, denser, rounded agglomerates of coal particles which can readily be recovered while the inorganic ash-forming impurities remain in suspension.

In traditional coal cleaning operations, water-based systems predominate. There are situations, however, in which it would be advantageous to be able to work with coal particles which are suspended in an organic liquid medium. Such is the case when the coal-organic liquid mixture is to be used directly in a further operation, such as in coal-in-oil pipeline transportation, in coal-in-oil slurry combustion and as a feedstock in advanced coal conversion processes. The cleaning of coal while it is suspended in an organic liquid can be accomplished by the present invention.

In conventional coal agglomeration from water suspensions, fairly intensive mixing, such as that in a blender, can be used. The agitation serves initially to disperse the hydrocarbon bridging liquid in the water suspension and later to contact the hydrocarbon droplets and the carbonaceous particles so that bonds can be formed between colliding oil-coated particles. In attempting to agglomerate the ash constituents from finely divided coal suspended in liquid hydrocarbon slurries, however, it was found that little ash agglomeration occurred and, with propeller-type agitation, only small, relatively weak flocs were formed. These ash agglomerates were not sufficiently large nor sufficiently strong to be removed (for example by screening) from the coal-oil suspension.

This greater difficulty in agglomerating ash constituents from a coal-in-oil slurry compared with the agglomeration of the carbonaceous constituents from a coal-in-water slurry is related to the fact that a minor solid constituent is being agglomerated in the former case as compared with a major constituent in the latter. Thus, during the former ash agglomeration, the more numerous carbonaceous particles tend to mask the aqueous bridging liquid droplets and the ash particles from one another. Also, once wetted, the probability of two or more ash particles coming in contact is much reduced by the presence of the major carbonaceous particle phase. In addition, since the ash particles are only a minor constituent of the original coal sample, the ash particles will probably tend to be contaminated more by the carbonaceous material after grinding than will the carbon particles be contaminated by ash material. Thus, from the point of view of surface chemistry, the ash particles will tend to be less hydrophilic because of this carbon contamination and will be more difficult to wet with water in a hydrocarbon suspension (compared with the wetting of coal particles by oil in a water suspension) and will thus form weak agglomerates.

U. S. Pat. No. 4,033,729 discloses adding an aqueous agglomerating liquid and hydrophilic particles to a coal-in-oil system to remove inorganic solids wherein a tumbling action of the entire system is necessary to effect the separation.

The method of U.S. Pat. No. 4,033,729 and the method according to the present invention both involve the addition of hydrophilic material for contact with the coal-in-oil slurry in order to increase the opportunities for ash-hydrophilic material contact and subsequent adhesion and removal of the ash particles. The prior method also makes use of agitation to grow the agglomerates, in view of the weak bonding obtained with the ash agglomerates. However, according to the invention, the hydrophilic material is employed in the form of an aqueous paste which tenaciously clings to the impellers of a contactor, particularly a multi-paddle contactor having two sets of counter-rotating paddles, wherein the paddles have large surface areas and are rotated at a relatively low speed. Thus, according to the invention, there is achieved liquid-paste contacting wherein the paste is subjected to kneading and folding during the contacting. The process of the invention possesses numerous advantages over the process of U.S. Pat. No. 4,033,729, including (1) the paste allows carbonaceous combustible hydrophobic particles that may become trapped in the paste to be washed out from the paste, thereby improving coal recovery, (2) shorter contacting times are needed when the paste is used, apparently because of the continual exposure of new surfaces of the paste due to the masticating action caused by rotation of the impellers and because the paste is wetter, (3) it is not necessary to screen agglomerates to remove same from the coal-in-oil system.

According to the invention, in an optional preferred first step, a slurry of coal in a water-immiscible or hydrophobic organic liquid is mixed with water as a bridging agent, for example, by recirculation through a centrifugal pump. This initial intensive agitation serves to disperse the water and condition the ash particles by adsorption of the bridging agent. This step is not always necessary, but it unexpectedly provides better results, as shown by the data given hereinbelow. The slurry, with or without performing the optional first step, is then placed in a contacting vessel containing a paste obtained by mixing water with a finely divided hydrophilic material, which material is insoluble or substantially insoluble in water, insoluble in the hydrophobic organic liquid, inert to the hydrophobic organic liquid and the hydrophobic carbonaceous combustible materials present therein, and which preferentially absorbs or collects the hydrophilic constituents of the coal, but does not substantially adsorb or collect the hydrophobic carbonaceous combustible constituents of the coal. The particulate hydrophilic material of the paste provides hydrophilic surfaces for adsorption of hydrophilic constituents of the coal by capillary adhesion, viscous adhesion, etc.

The contacting of the coal-in-oil slurry with the aqueous paste containing hydrophilic adsorbent takes place in a contactor which comprises any conventional paddle-type agitator, various types of which are widely used for mixing high viscosity materials, for example, multi-paddle agitators. Such agitators have one or a plurality or rotating impellers or paddles, having large surface areas. In the invention, such paddles are rotated at relatively low speed. An example of a suitable agitator is one having two sets of counter-rotating, interdigitated, horizontal, parallel paddles of large surrace areas wherein the paddles of the respective sets rotate in opposite directions at low speeds, such as on the order of 60 rpm. For example, there can be used a so-called "grease kettle," as disclosed in Gallay, W. et al., Can. J. Research B22, 90 (1944). The hydrophilic absorbent phase consisting of an aqueous paste of the hydrophilic adsorbent adheres to the surfaces of the impellers. The paste layers on the impellers are kneaded by rotation of the impellers to continually expose new surfaces of the paste to the coal-in-oil slurry which surrounds them. The slurry is also mixed simultaneously by rotation of the impellers.

In the paddle-type contactor the flow pattern of the coal-in-oil slurry is primarily a circular path around the vessel. No high speed streams are formed and there is very little top-to-bottom turnover of the liquid. There is a mild swirling of the slurry in the zone between adjacent paddles. Although the slurry does not move at a high velocity, the velocity of the slurry is sufficiently high that the paste films tenaciously adhering to the impellers are gently agitated to continually expose new portions on the surfaces of the layers but without, however, destroying the structural integrity of the layers.

A number of experiments were done in which various types of inorganic pastes were used as collectors for the liberated ash in the coal-in-oil slurry, using the grease kettle as a contactor. The aqueous pastes examined employed starches (potato, corn), gelatin, clays (bentonite, "Dixie") and finely divided materials (iron oxide, alumina, silica flour, calcium carbonate and magnesium carbonate). In these experiments, the coal-in-oil slurry was not prewetted with water in a blender and thus the ash-forming impurities were not flocculated before contact with the pastes in the contactor. It was found that certain of the pastes, such as those based on potato starch, gelatin, and bentonite clay, tended to adsorb not only the ash particles but also picked up a large portion of the coal particles. It is probable that there was surface chemical interaction in these cases and that components of the pastes were able to link chemically with and condition the coal particles so that they became incorporated into the pastes in large numbers. On the other hand, the pastes based on finely divided inert materials, such as silica flour and iron oxide, allowed most of the coal particles to remain in suspension while preferentially adsorbing the ash constituents. It is important to maintain the pastes of these inert materials, through adjustment of water content, sufficiently coherent to remain attached to the impellers of the contactor, and intact, throughout the course of procedure. In these experiments with pastes of inert finely divided materials, the ash content of the coal was reduced from about 20 wt. % to 6 to 9 wt. %, while over 90 wt. % of the solid carbonaceous combustible components of the coal remained in the oil suspension.

In subsequent experiments, a paste of silica flour containing 32 wt. % water (dry basis), was used unless stated otherwise.

Table 1 shows the results of a series of experiments in which the effect of the amount of paste in contact with the slurry was assessed. In these experiments no prewetting of the ash constituents was done and the contact time in the grease kettle was held constant at 10 minutes. The ash content of the product coal was reduced significantly as the amount of paste in contact with the slurry was increased. There is also an attendant small increase in the amount of coal retained by the paste, although the proportion remaining in suspension is high at well over 90 wt. % of the original solid combustible matter.

The coal used in these experiments was a Polish Coal which contained approximately 20 wt. % ash and less than 1 wt. % sulfur.

Examples of Coal Beneficiation

The coal, as received, was in an aqueous phase and it was vacuum filtered and dried at 110° C. overnight. Coal slurries were prepared by placing 150 grams of dried coal in a 1 liter jar mill containing 46¾ inch steel balls and 300 cm$^3$ of Varsol and grinding same for 4 hours at 68 rpm. Virtually all the particles were finer than 200 mesh. After grinding, the coal slurries were transferred to a 4 liter Pyrex jar with a spigot on the bottom (through which the coal slurry samples were removed), and diluted to a 25% pulp density (25 grams of solids/100 cm$^3$ of slurry). The jar was fitted with a rubber stopper through which a stirrer passed, preventing evaporation losses. This allowed the slurry to be constantly stirred, avoiding pulp density gradients in the container, thus providing homogeneous samples for a series of experiments.

Four runs using 25, 50, 75 and 100 grams of silica flour as collector were conducted. The silica flour was placed in the grease kettle. An amount of distilled water, equivalent to 32% of the silica weight, was added and thoroughly mixed whereby to form a paste which adhered to the impellers. An increment of 100 cm$^3$ of coal slurry and a volume of distilled water (equal to 32 wt. % of the ash content assuming the coal contained 20% ash) were then added to the grease kettle and the contents were mixed for 10 minutes. The coal slurry was then decanted and the procedure repeated. Four increments of coal in each run were treated in this manner. The paste was then washed by contacting it with fresh Varsol three or four times (until the washings were clear). The washings were added to the product.

The product and tailings fractions were treated and analyzed.

The results are shown in Table I.

In the following table and hereinafter, the term "d.b." means dry basis.

TABLE 1

Effect of Initial Amount of Paste during Ash Removal in Grease Kettle 10 min. contact in grease kettle
100 cm$^3$ of 25 w/v % coal-in-Varsol suspension
No prewetting of ash in blender; 32% water (d.b.) added to suspension in grease kettle as bridging liquid

| Quantity of Paste | % Ash (d.b.) | % Recovery of Combustibles | Wt. % Varsol Retained in Paste |
|---|---|---|---|
| 25g silica flour +8g water | 18.9 | 99.3 | 15.9 |
| 50g silica flour +16g water | 16.6 | 98.4 | 7.7 |
| 75g silica flour +24g water | 10.8 | 95.6 | 6.2 |
| 100g silica flour +32g water | 7.5 | 94.6 | 5.4 |

The effect of prewetting the coal suspension in a blender prior to contact with the paste is shown in the series of experiments in Table 2. These tests were performed using slurries of various pulp densities prepared by adding various amounts of Varsol to the coal slurry described previously. Thirty-two percent by weight of distilled water, based on the amount of ash in the coal in the slurry, was blended with the slurry before placing the slurry in the grease kettle. The remainder of this experiment was the same as in the previously described experiment.

It will be noted that the pulp density in the blender had little effect on the ash content of the product. A comparison of the ash content of the best product in Table 1 with the ash contents in Table 2, however, shows that a significant reduction in ash content occurs when prewetting is used. Since the same contact time of 10 min. was used in both series of experiments, it appears that addition of the water in the blender to flocculate the ash particles prior to contacting the paste in the grease kettle allows more ash particles to be absorbed by the paste during the duration of the experiment.

TABLE 2

Effect of Pulp Density in Blender during Prewetting Step prior to Experiments in Grease Kettle 100g silica flour mixed with 32g water used as paste
100 cm$^3$ of 25 w/v % coal-in-Varsol suspension
32% water (d.b.) added to suspension in blender as bridging liquid
5 min. mixing in blender; 10 min. contact in grease kettle

| Pulp Density in Blender % w/v | % Ash (d.b.) | % Recovery of Combustibles | Wt. % Varsol Retained in Paste |
|---|---|---|---|
| 5 | 4.5 | 93.2 | 4.9 |
| 10 | 4.8 | 94.9 | 3.9 |
| 15 | 4.4 | 93.0 | 3.6 |
| 25 | 5.1 | 93.5 | 4.4 |

Finally, the effect of the moisture content (and hence of the consistency) of the silica flour paste was examined.

The coal was ground and stored as previously described. 200 cm$^3$ samples were diluted with Varsol to give a pulp density of 10%. Water additions of 25, 30 32 and 35 wt. % (based on the weight of ash present in the coal samples) were added to the diluted pulps and blended in a blender, in a plastic container, for 5 minutes. The pulp was settled and clear Varsol decanted until the pulp density reached 25%. This material was then added to the grease kettle which contained 100 grams of silica flour with 32 percent of water, based on the silica, added and well mixed. In each case, two increments of the coal sample were contacted with the paste for 10 minutes. The paste was then washed with clear Varsol. Product and tail fractions were treated and analyzed as previously described.

From the results in Table 3 it is evident that an optimum moisture content in the range of 25 to 30% (dry basis) exists for maximum ash removal. The lower limit is imposed by the minimum moisture needed to form a coherent paste suitable for sticking to and working in the impellers of the grease kettle. With high moisture contents, the paste becomes too fluid to handle satisfactorily in the contactor and the adhesion of ash particles to the paste, necessary for their absorption into the bulk of the paste, may be reduced as the high curvature, strong, concave water surface at lower moisture contents are converted to lower curvature, weaker, convex surfaces at higher moisture levels.

TABLE 3

Effect of Water Content added in Prewetting Step in Blender on Ash Removal in Grease Kettle 10 w/v % coal-in-Varsol suspension in blender mixed with stated amounts of water bridging liquid; other conditions as in Table 2.

| % Water (d.b.) added in contactor | % Ash (d.b.) | % Recovery of Combustibles | Wt. % Varson Retained in Paste |
|---|---|---|---|
| 25 | 3.4 | 95.1 | 6.4 |
| 30 | 3.9 | 94.9 | 5.9 |
| 32 | 4.8 | 94.9 | 5.2 |
| 35 | 6.4 | 95.5 | 6.3 |

In a simulated continuous process, aqueous pastes of adsorbents were used initially to "seed" the ash removal process; a multitude of batch runs, using conditions similar to those described already, were then done using fresh coal-hydrocarbon suspension for each batch experiment but retaining the same adsorbent material throughout the series. As ash was removed from the coal suspension and became incorporated in the adsorbents, this latter phase increased in volume and the process would eventually become self-sustaining without the need for additional hydrophilic adsorbents.

In the grease kettle, 100 g of silica flour and 32 g of water were used to make the initial paste. This was then used to treat 450 g of coal in 18 batch increments, after which the experiment was ended. The coal remaining in suspension from the runs had a composite ash content of 4.2%.

This series of experiments indicates that a continuous ash agglomeration process based on contacting the coal-oil slurry with the aqueous paste of adsorbent can be operated without the addition of hydrophilic adsorbent after the initial charge. Adsorbents in the form of separated ash would have to be discarded in continuous operation. This then raises the question of the loss of valuable hydrocarbon in the discarded ash. The data in Tables 1 to 3 show that on the order of 5 wt. % hydrocarbon is contained in the paste. Based on a coal undergoing a reduction in ash content equivalent to 15% of its initial weight and assuming that a steady state, the discarded adsorbents are made up entirely of separated ash, it is evident that the hydrocarbon loss would be about 1% by weight of the feed coal. This is much less hydrocarbon than is normally required in a coal agglomeration process and recovery from the discarded ash would probably not be justified.

Example of Aqueous Emulsion Treatment 96.9 g of a water-in-oil emulsion consisting of 39.6 wt. % of water emulsified in western Canadian crude oil was placed in a grease kettle and 136.1 g of silica flour was added to the emulsion. 8 g of diesel oil were added to the emulsion to reduce the viscosity thereof. The paddles of the grease kettle were counter-rotated at 60 rpm to effect mixing. It was observed that a viscous paste of silica flour and water formed in the grease kettle and stuck to the paddles thereof so that the paddles became coated with the paste. After 15 minutes of mixing and contacting, the liquid oil phase was removed. Examination of the liquid oil phase under a microscope revealed that the oil was substantially free of water.

Example of Tar Sands Treatment 50 g of Athabasca tar sands dispersed in 100 g of hexane are contacted with 100 g of a paste of silica flour containing 28 wt. % of water for 10 minutes in the grease kettle. The siliceous and clay materials present in the tar sands are adsorbed by the paste and are substantially completely removed from the liquid phase.

The hydrophilic constituent or constituents of the starting hydrophobic mixture or suspension is initially present in finely divided form. Normally solid hydrophilic constituents have a maximum particle size of less than about 100 mesh (Tyler). The minimum particle size of the hydrophilic constituent is not critical. Also when the hydrophilic constituent is a liquid, such as water, the droplet size thereof is not critical.

The hydrophilic adsorbent used in the paste has a maximum particle size of less than about 100 mesh, preferably less than 325 mesh. The minimum particle size is not critical.

The hydrophobic or water-immiscible organic liquid used in the starting hydrophobic mixture or suspension is not critical and it can be selected from a wide variety of hydrocarbon and halogenated hydrocarbon materials which are useful for this purpose. For example, the organic liquid can be hexane, Varsol (trademark for aliphatic petroleum solvent b.p. 148–210° C.), trichloroethylene, crude oils, fuel oil, kerosene, etc.

The hydrophilic adsorbent is insoluble or substantially insoluble in water, insoluble in the hydrophobic organic liquid and inert thereto, inert to any hydrophobic constituents present in hydrophobic organic liquid and capable of adsorbing the hydrophilic constituents of the starting mixture. An adsorbent suitable for one starting mixture may not be equally suitable for a different starting mixture and routine experimentation may be necessary for determining the optimum adsorbent for a particular starting mixture. The adsorbent will usually be selected from inexpensive materials if possible. For example, depending on the constituents of the starting mixture, there can be used, as hydrophilic adsorbent, starches such as potato starch and corn starch, gelatin, clays such as bentonite and kaolin, calcium carbonate, magnesium carbonate, ferric oxide, aluminum oxide and silica flour. For the specific purpose of removing ash-forming constituents from coal, it is preferred to use ferric oxide and silica flour, especially silica flour.

The amount of water used to make the tenacious paste will vary depending on the paste-forming properties of the adsorbent used. For example, the amount of water can be as high as about 92.5% when starches are used, and it can be as low as about 20% when silica flour is used. What is important is that the amount of water is selected so that a stable, tenacious paste of the absorbent is formed and maintained. In the case of using silica flour and ferric oxide to remove hydrophilic ash-forming constituents from coal, the amount of water used is from 25 to 35 wt. %, based on the silica flour or ferric oxide.

The amount of adsorbent used will depend on the content of the hydrophilic constituent desired to be removed from the hydrophilic mixture, the affinity of the adsorbent therefor and the affinity of the hydrophobic liquid therefor. Usually the ratio of adsorbent to hydrophilic constituent will be at least 1/1, preferably at least 3/1. The maximum amount of adsorbent is not critical but for economic reasons, the maximum ratio of adsorbent to hydrophilic constituent is about 100/1, preferably about 10/1.

The viscosity of the paste is such that the paste will tenaciously cling to the surfaces of the impellers at the particular speed of rotation of the impellers used in the contacting step and, also, the paste will be sufficiently fluent that it can be gently agitated during the contacting step to continually expose new surfaces thereof for contact with and adsorption of hydrophilic constituents from the starting hydrophobic mixture. In general, the viscosity of the paste will be from about 10,000 to about 200,000 cp.

When the paste adsorbs solid hydrophilic constituents, the ratio of water/solids in the paste changes at time passes. It is possible that this may change the paste properties so that it will no longer be a tenacious layer adhering to the impellers of the contactor. In order to avoid this problem, water can be added to the contactor, from time to time as needed, to restore the water/solids ratio to a value that maintains the paste in the state of a tenacious layer.

Although the foregoing description refers to the preferred procedure wherein a tenacious layer of an aqueous paste of hydrophilic adsorbent is preformed and is adhered to the impellers of the contactor before the flowable hydrophobic mixture is added, in some instances the paste can be formed in situ during the course of the contacting step, for example, when the flowable hydrophobic mixture contains sufficient water to form an aqueous paste of the hydrophilic adsorbent. In this type of operation, the starting flowable hydrophobic mixture containing water is mixed in the contactor with the particles of hydrophilic adsorbent. During the course of the contacting and mixing, the particles of hydrophilic adsorbent initially adsorb water from the starting flowable hydrophilic mixture to form a paste which eventually adheres to the impellers. Continuation of the mixing and contacting after the paste is formed will be effective to remove the remaining hydrophilic constituents from the flowable hydrophobic mixture in the same way as previously described. In this type of operation, the total duration of the mixing and contacting time can be longer than in a process wherein a preformed paste is used. In like fashion, the water necessary for forming the paste can be added separately from the particles of hydrophilic adsorbent and the flowable hydrophobic mixture during the mixing and contacting.

The embodiments of the invention in which an exclusive property or privilege is claimed are defined as follows:

1. A process for removing hydrophilic constituents from a mixture of said hydrophilic constituents with a hydrophobic organic oil wherein said hydrophilic constituents are present in finely divided form, which comprises the steps of: contacting said mixture with a fluent tenacious layer of paste prepared by mixing water with fine particles of hydrophilic adsorbent which adsorbent is insoluble or substantially insoluble in water, insoluble in and inert to said organic oil and any hydrophobic materials contained in said mixture and which preferentially adsorbs said hydrophilic constituents, and moving said mixture across the surface and said layer of paste to gently agitate said layer of paste, without destroying the structural integrity of said layer, to continually expose different portions of said paste on the surface of the layer and contact same with said mixture so that the hydrophilic constituents of said mixture become preferentially wetted by the water in the paste and are adsorbed by said hydrophilic adsorbent; and then separating the remainder of said mixture from said paste.

2. A process as claimed in claim 1, wherein said layer of paste is formed on and tenaciously clings to the surfaces of rotatable paddles of a multi-paddle contactor and wherein said mixture is contacted with and moved across said layer of paste by rotating said paddles in a bath of said mixture.

3. A process as claimed in claim 2 wherein said layer is formed by placing water and said fine particles of hydrophilic adsorbent in said contactor and then rotating said paddles to mix same therein and to form said layer, and then adding said mixture to said contactor and rotating said paddles.

4. A process as claimed in claim 3 wherein said contactor comprises two sets of parallel paddles wherein each paddle of one set is disposed between and is movable between a pair of paddles of the other set and wherein said sets of paddles are rotated in opposite directions at relatively low speeds during the contacting step.

5. A process according to claim 1 in which before said contacting step, said mixture is blended with water to form flocs of said hydrophilic constituents in said mixture.

6. A process according to claim 1 in which said hydrophobic organic oil is selected from the group consisting of liquid aliphatic hydrocarbons, chlorinated liquid aliphatic hydrocarbons and liquid petroleum and fractions thereof, and said hydrophilic adsorbent is selected from the group consisting of starch, clay, calcium carbonate, magnesium carbonate, ferric oxide, aluminum oxide and silica.

7. A process according to claim 1 in which the maximum particle sizes of said hydrophilic constituent and said hydrophilic adsorbent are less than 100 mesh.

8. A process according to claim 1 in which the weight ratio of said hydrophilic adsorbent/hydrophilic constituent is from 1/1 to 100/1.

9. A process according to claim 1 in which said adsorbent is silica flour and the weight ratio of said hydrophilic adsorbent/hydrophilic constituent is from 1/1 to 100/1.

10. A process as claimed in claim 1 in which said paste has a viscosity in the range of from about 10,000 to about 200,000 cp.

11. A process as claimed in claim 1 in which the weight ratio of hydrophilic adsorbent/hydrophilic constituent is from 3/1 to 10/1.

12. A process for removing hydrophilic inorganic, ash-forming constituents from a flowable slurry of coal particles in a hydrophobic organic oil, which comprises the steps of: contacting said slurry with a fluent tenacious layer of a paste prepared by mixing water with fine particles of inorganic hydrophilic adsorbent which adsorbent is insoluble or substantially insoluble in water, insoluble in said organic oil, inert to said organic oil and the carbonaceous combustible constituents of said coal and which preferentially adsorbs the hydrophilic, inorganic, ash-forming constituents of said coal, without adsorbing substantial amounts of carbonaceous combustible constituents of the coal, and moving said slurry across the surface of said layer of paste to gently agitate said layer of paste, without destroying the structural integrity of the layer, to continually expose different portions of said paste on the surface of the layer and contact same with said slurry so that said hydrophilic, inorganic, ash-forming constituents become preferentially wetted by the water in said paste and are adsorbed by said hydrophilic adsorbent, and then separating the remainder of said slurry from said paste.

13. A process as claimed in claim 12 wherein said layer of paste is formed on and tenaciously clings to the surfaces of rotatable impellers of a multiple impeller contactor and wherein said slurry is contacted with and moved across said layer of paste by rotating said impellers in a bath of said slurry.

14. A process as claimed in claim 13 wherein said layer is formed by placing water and said fine particles of said inorganic hydrophilic adsorbent in said contactor and then rotating said impellers to mix same therein and to form said layers on said impellers, and then adding said slurry to said contactor and rotating said impellers.

15. A process as claimed in claim 14 wherein said contactor comprises two sets of parallel paddles wherein each paddle of one set is disposed between and is movable between a pair of paddles of the other set and wherein said sets of impellers are rotated in opposite directions at relatively low speeds during the contacting step.

16. A process according to claim 12 in which before said contacting step, said slurry is blended with water to form flocs of said hydrophilic, inorganic, ash-forming constituents in said coal.

17. A process according to claim 12 in which said hydrophobic organic oil is selected from the group consisting of liquid aliphatic hydrocarbons, chlorinated liquid aliphatic hydrocarbons and liquid petroleum and fractions thereof, and said hydrophilic adsorbent is selected from the group consisting of magnesium carbonate, ferric oxide, aluminum oxide and silica.

18. A process according to claim 12 in which the maximum particle sizes of said hydrophilic, inorganic, ash-forming constituent and said hydrophilic adsorbent are less than 100 mesh.

19. A process as claimed in claim 12 in which said paste has a viscosity in the range of from about 10,000 to about 200,000 cp.

20. A process as claimed in claim 12 in which the weight ratio of hydrophilic adsorbent/hydrophilic constituent is from 3/1 to 10/1.

* * * * *

UNITED STATES PATENT AND TRADEMARK OFFICE
CERTIFICATE OF CORRECTION

PATENT NO. : 4 303 505

DATED : December 1, 1981

INVENTOR(S) : Charles E. Capes et al

It is certified that error appears in the above—identified patent and that said Letters Patent is hereby corrected as shown below:

Column 10, line 12; change "and" to ---of---.

Column 10, line 43; change "constituents" to ---constituent---.

Signed and Sealed this

Twenty-third Day of March 1982

[SEAL]

Attest:

GERALD J. MOSSINGHOFF

*Attesting Officer*  *Commissioner of Patents and Trademarks*